United States Patent
Kataoka et al.

(10) Patent No.: US 11,797,581 B2
(45) Date of Patent: Oct. 24, 2023

(54) TEXT PROCESSING METHOD AND TEXT PROCESSING APPARATUS FOR GENERATING STATISTICAL MODEL

(71) Applicant: FUJITSU LIMITED, Kawasaki (JP)

(72) Inventors: Masahiro Kataoka, Kamakura (JP); Ryo Matsumura, Numazu (JP); Satoshi Onoue, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 801 days.

(21) Appl. No.: 16/432,002

(22) Filed: Jun. 5, 2019

(65) Prior Publication Data
US 2019/0377746 A1    Dec. 12, 2019

(30) Foreign Application Priority Data
Jun. 12, 2018    (JP) .................................. 2018-111863

(51) Int. Cl.
*G06F 16/31*    (2019.01)
*G06F 40/56*    (2020.01)
(Continued)

(52) U.S. Cl.
CPC .......... *G06F 16/319* (2019.01); *G06F 40/216* (2020.01); *G06F 40/242* (2020.01);
(Continued)

(58) Field of Classification Search
CPC ...... G06F 16/319; G06F 40/242; G06F 16/22; G06F 16/2219; G06F 16/2228; G06F 40/216; G06F 40/284; G06F 40/289; G06F 40/56; H03M 7/30; H03M 7/40; H03M 7/6011; H03M 7/3088; H03M 7/3082; H03M 7/3084
See application file for complete search history.

(56) References Cited

U.S. PATENT DOCUMENTS 5,168,533 A * 12/1992 Kato ....................... G06F 16/93
382/229
5,704,060 A * 12/1997 Del Monte ............. H03M 7/40
704/7
(Continued)

FOREIGN PATENT DOCUMENTS

JP    H1-185790 A    3/1999
JP    2014-146301 A    8/2014
(Continued)

OTHER PUBLICATIONS

Khurana et al. Text Compression and Superfast Searching. ArXiv. org. pp. n/a. 2005. (Year: 2005).*
Wang et al. Sentence Vector Model Based on Implicit Word Vector Expression. DOI:10.1109/ACCESS.2018.2817839. Published IEEE Access Mar. 26, 2018, vol. 6. pp. 17455-17463. (Year: 2018).*
(Continued)

*Primary Examiner* — Amy M Levy
(74) *Attorney, Agent, or Firm* — WHDA, LLP

(57) ABSTRACT

An information processing apparatus accepts text data. When specifying a word included in the accepted text data, the information processing apparatus generates a code associated with the specified word and generates information that associates the appearance position of the specified word in the text data with the word. The information processing apparatus stores therein the generated code and the information in association with the accepted text data.

2 Claims, 8 Drawing Sheets

(51) Int. Cl.
  *G06F 40/242* (2020.01)
  *G06F 40/289* (2020.01)
  *G06F 40/284* (2020.01)
  *G06F 40/216* (2020.01)

(52) U.S. Cl.
  CPC .......... *G06F 40/284* (2020.01); *G06F 40/289* (2020.01); *G06F 40/56* (2020.01)

(56) References Cited

U.S. PATENT DOCUMENTS

| | | | | |
|---|---|---|---|---|
| 5,778,361 | A | * | 7/1998 | Nanjo .................. G06F 16/319 707/999.005 |
| 2013/0211819 | A1 | * | 8/2013 | Kagan .................. G06F 40/40 704/3 |
| 2014/0214808 | A1 | | 7/2014 | Satoh |
| 2017/0300507 | A1 | | 10/2017 | Kataoka et al. |
| 2019/0272343 | A1 | * | 9/2019 | Pidduck ............ G06F 16/24526 |
| 2021/0144405 | A1 | * | 5/2021 | Sharangpani ....... H03M 7/3091 |
| 2021/0319167 | A1 | * | 10/2021 | Tan ...................... G06N 3/0445 |

FOREIGN PATENT DOCUMENTS

| | | |
|---|---|---|
| JP | 2015-106346 A | 6/2015 |
| JP | 2016-106332 A | 6/2016 |
| JP | 2017-21523 A | 1/2017 |
| JP | 2017-194762 A | 10/2017 |

OTHER PUBLICATIONS

Kumar, Harsh. A plain-text compression technique with fast lookup ability. Thesis Submitted to the Office of Graduate and Professional Studies of Texas A&M University (2016). 35 pages. (Year: 2016).*
Sharma et al. A review on various lossless text data compression techniques. Research Cell : An International Journal of Engineering Sciences, Issue Dec. 2014, vol. 2 ISSN: 2229-6913 (Print), ISSN: 2320-0332 (Online) © Vidya Publications. 6 pages. (Year: 2014).*
Krishan. How to Use Words Co-Occurrence Statistics to Map Words to Vectors. Blog entry posted Jun. 23, 2015. Retrieved from [https://iksinc.online/2015/06/23/how-to-use-words-co-occurrence-statistics-to-map-words-to-vectors/] on [Feb. 24, 2022]. 21 pages. (Year: 2015).*
Yeh et al. Chinese spelling checker based on an inverted index list with a rescoring mechanism. ACM Trans. Asian Low-Resour. Lang. Inf. Process. 14, 4, Article 17 (Oct. 2015), 28 pages. DOI:http://dx.doi.org/10.1145/2826235. (Year: 2015).*
Jo, Taeho. Inverted Index based Modified Version of K-Means Algorithm for Text Clustering. Journal of Information Processing Systems, vol. 4, No. 2, Jun. 2008. pp. 67-76. DOI : 10.3745/JIPS.2008.4.2.067. (Year: 2008).*
Office Action dated Sep. 5, 2023 issued in counterpart JP application No. 2022-092800, with English translation. (7 pages).
Extracting Important Information from Multiple Documents and Creating Tables, the twenty fourth annual meeting of a language processing society [online], Japan, Language Processing Society, two thousand eighteenth annual meeting, 2018, pp. 240 to 243, (4 pages).

* cited by examiner

| WORD VECTOR | CO-OCCURRENCE WORD VECTOR (CO-OCCURRENCE RATE) | ... | CO-OCCURRENCE WORD VECTOR (CO-OCCURRENCE RATE) |
|---|---|---|---|
| ... | ... | ... | ... |
| WORD VECTOR OF WORD CODE "A015" | ... | ... | ... |
| WORD VECTOR OF WORD CODE "A025" | D$\alpha$108F97 (37%) | ... | D$\alpha$108F19 (29%) |
| WORD VECTOR OF WORD CODE "A044" | ... | ... | ... |
| ... | ... | ... | ... |

| SENTENCE VECTOR | CO-OCCURRENCE SENTENCE VECTOR (CO-OCCURRENCE RATE) | ... | CO-OCCURRENCE SENTENCE VECTOR (CO-OCCURRENCE RATE) |
|---|---|---|---|
| ... | ... | ... | ... |
| Vs15 | D$\beta$108F97 (34%) | ... | D$\beta$108F19 (19%) |
| Vs25 | ... | ... | ... |
| Vs44 | ... | ... | ... |
| ... | ... | ... | ... |

TEXT PROCESSING METHOD AND TEXT PROCESSING APPARATUS FOR GENERATING STATISTICAL MODEL

CROSS-REFERENCE TO RELATED APPLICATION

This application is based upon and claims the benefit of priority of the prior Japanese Patent Application No. 2018-111863, filed on Jun. 12, 2018, the entire contents of which are incorporated herein by reference.

FIELD

The embodiments discussed herein are related to a computer-readable recording medium and the like.

BACKGROUND

Conventionally, in order to improve the accuracy of voice recognition and Kana-Kanji conversion, by performing machine learning on natural sentence texts based on phonemes and Kana characters that have the same pronunciation but different meanings registered in a word dictionary, a Hidden Markov Model (HMM) for words or sentences (sentence) are generated and enhanced. The HMM is a statistical model that can estimate, if a sentence including a character string having a certain homophone or a polysemous word is input, voice recognition of the most probable sentence or a converted kanji or the like. In a description below, an HMM of a sentence is referred to as a sentence HMM.

Here, it is convenient for a sentence HMM to perform estimation described above by using a vector of a sentence. Thus, when performing machine learning by using a natural sentence text, lexical analysis is performed on a natural sentence text, a process of accumulating vectors of each of the words constituting the sentence is performed, and a vector of the sentence is calculated.

In order to generate a word HMM or a sentence HMM, because a sentence adjacent to the sentence that contains a homophone or a polysemous word is extracted, there is a need to generate an inverted index and, furthermore, generate a vector of each sentence. In general, because ZIP compression is performed on data of a natural sentence text handled by a computer, when an inverted index is generated, a text that has been subjected to ZIP compression is decompressed and then the lexical analysis is performed. Furthermore, in also a case of calculating a vector of a sentence, it is assumed that a text that has been subjected to ZIP compression is decompressed and the lexical analysis is repeated. These related-art examples are described, for example, in Japanese Laid-open Patent Publication No. 2016-106332, Japanese Laid-open Patent Publication No. 2014-146301, Japanese Laid-open Patent Publication No. 2017-21523 and Japanese Laid-open Patent Publication No. 2015-106346.

SUMMARY

According to an aspect of an embodiment, a processing method includes: accepting text data, using a processor; specifying a word included in the accepted text data; first generating a code associated with the specified word, using the processor; second generating information that associates an appearance position of the specified word in the text data with the word, using the processor; third generating sentence vector data of a plurality of sentences included in the text data, using the processor; and storing the generated code, the information, and the sentence vector data in association with the accepted text data, using the processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Figure 7:
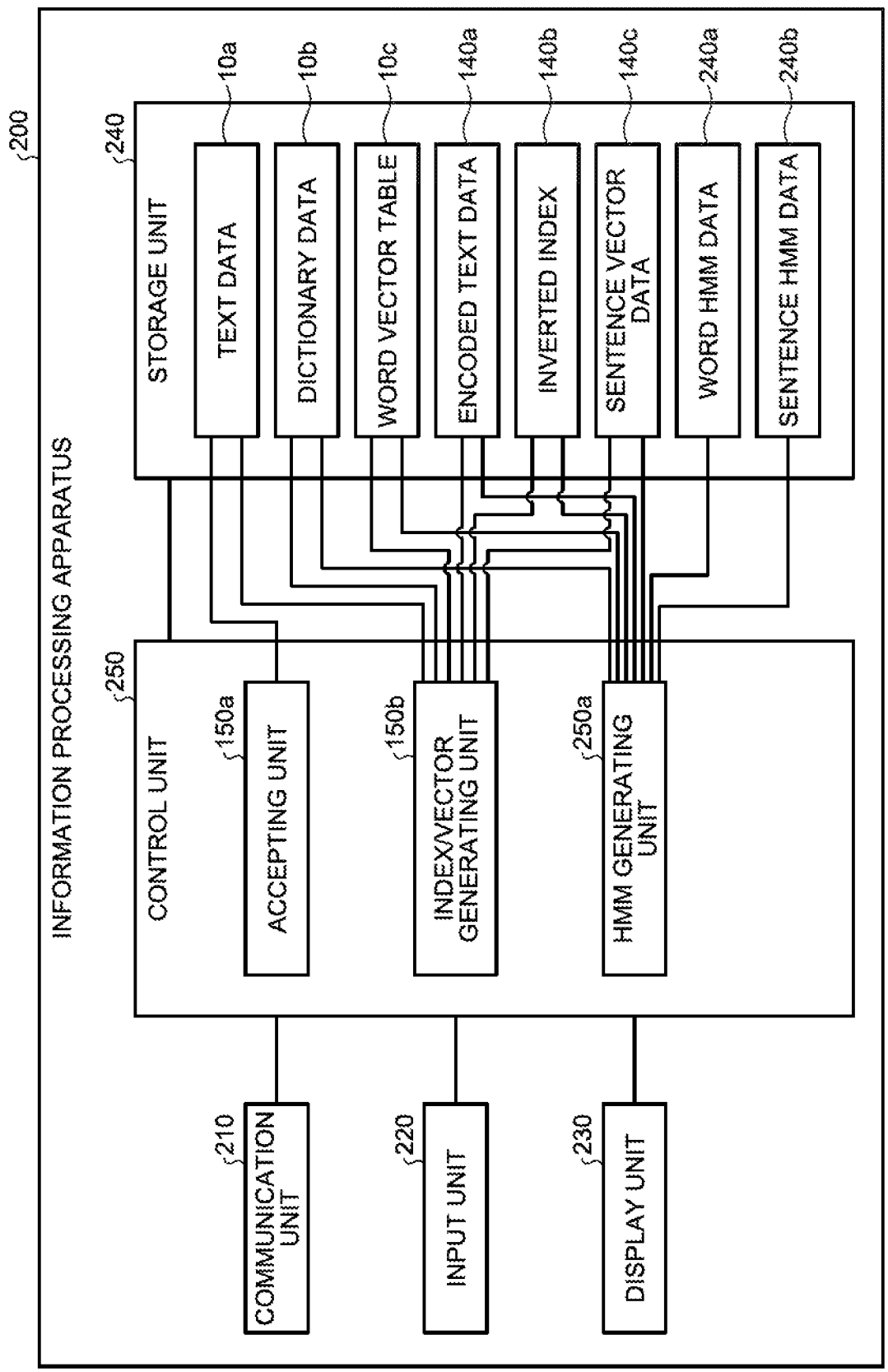
Figure 8:
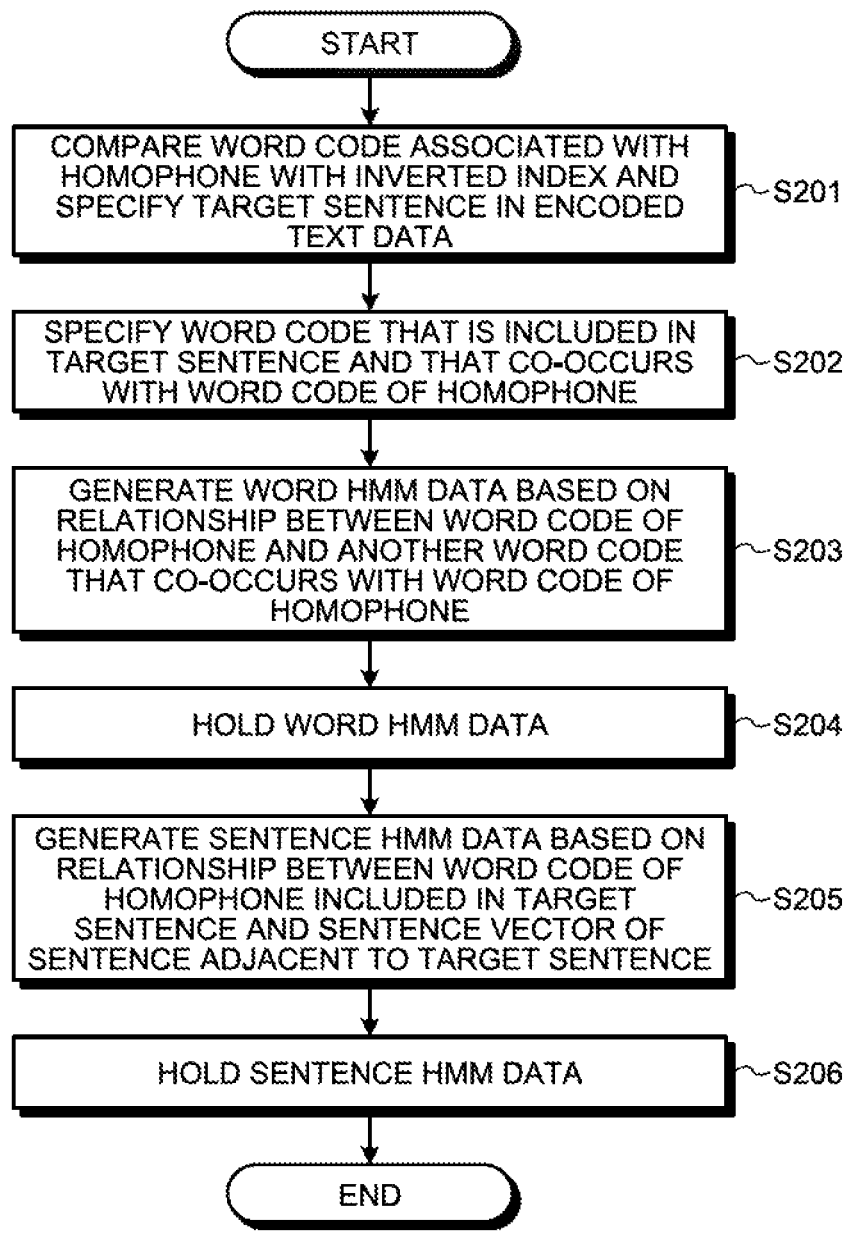
Figure 9:
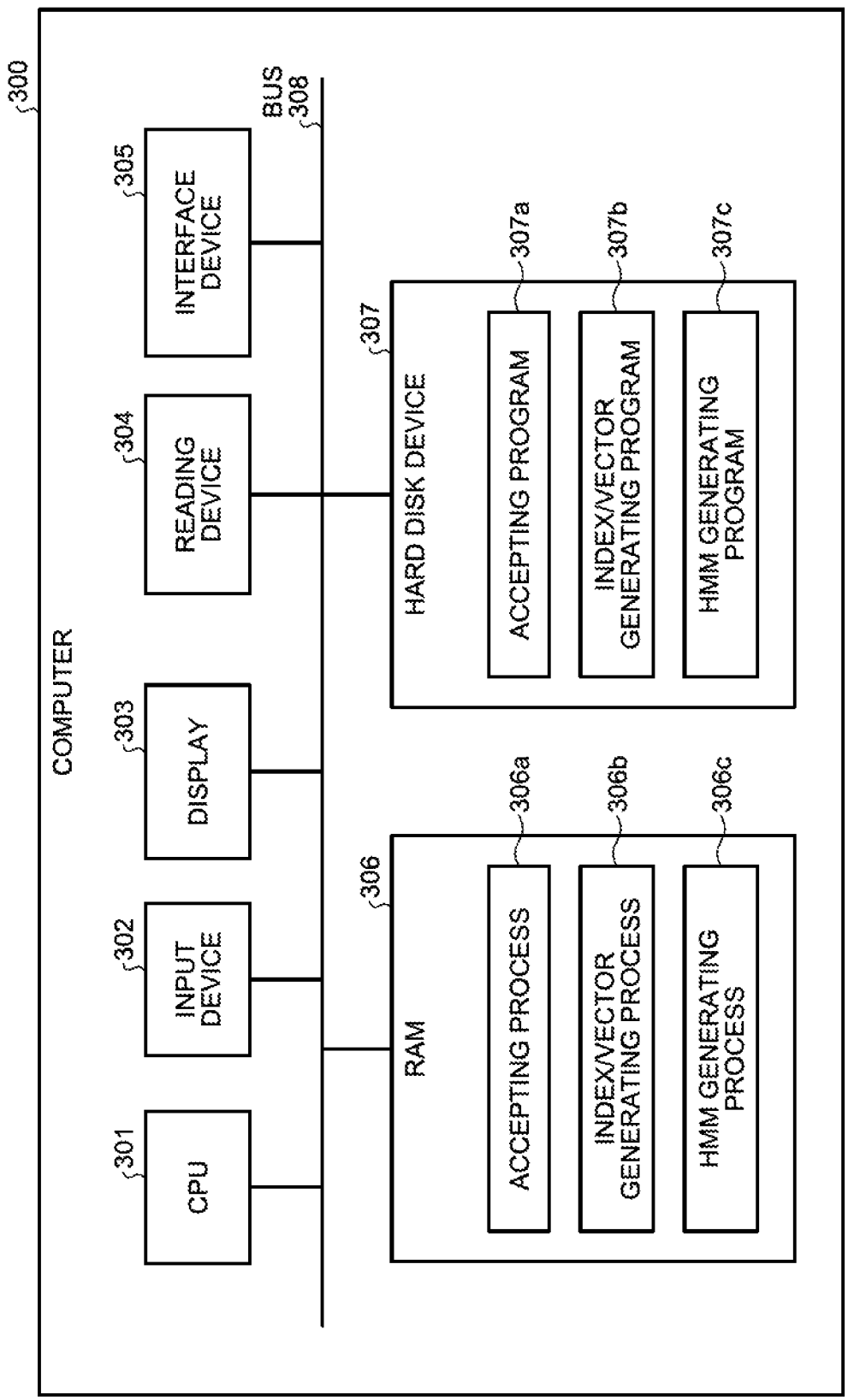

FIC. 4 is a diagram illustrating an example of a process of generating a word HMM and a sentence HMM;

FIG. 5 is a diagram illustrating an example of the data structure of word HMM data;

FIG. 6 is a diagram illustrating an example of the data structure of sentence HMM data;

FIG. 7 is a functional block diagram illustrating a configuration of an information processing apparatus according to a second embodiment;

FIG. 8 is a flowchart illustrating the flow of a process in which the information processing apparatus generates the word HMM data and the sentence HMM data; and FIG. 9 is a diagram illustrating an example of a hardware configuration of a computer that implements the same function as that of the information processing apparatus.

DESCRIPTION OF EMBODIMENTS

However, with the conventional technology described above, there is a problem in that it is not possible to speed up a process of generating a statistical model of, for example, a word HMM, a sentence HMM, or the like.

As described above, when generating a word HMM or a sentence HMM, in order to generate an inverted index of a homophone or a polysemous word or in order to calculate a vector of a sentence, it is not possible to speed up the process because lexical analysis is repeatedly performed by decompressing the text that has been subjected to ZIP compression.

Preferred embodiments of the present invention will be explained with reference to accompanying drawings. Furthermore, the present invention is not limited to the embodiments.

[a] First Embodiment

An information processing apparatus according to a first embodiment performs a process of generating an inverted index and a sentence vector based on text data on a natural sentence.

Figure 1:
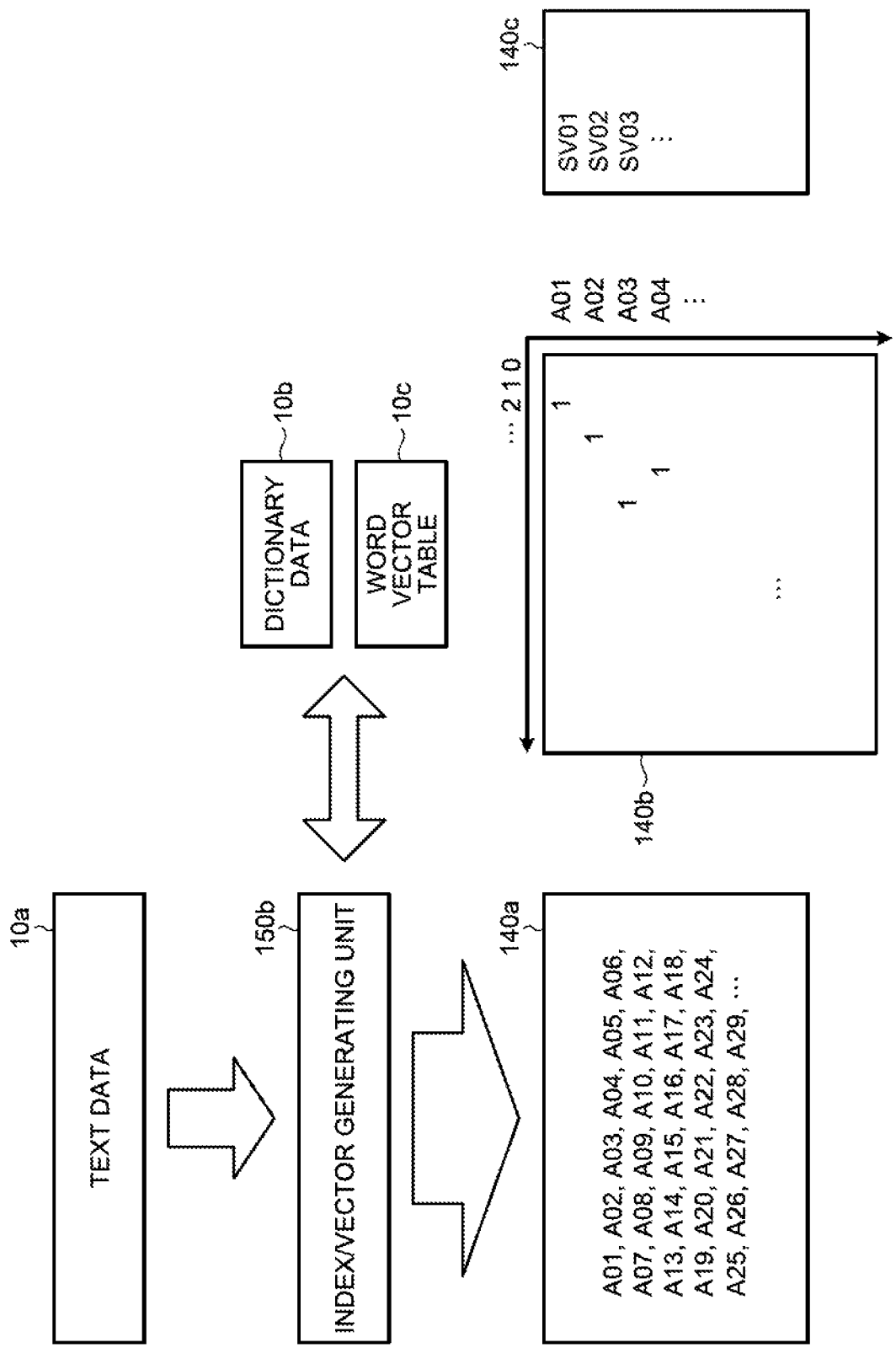
FIG. 1 is a diagram illustrating an example of process of generating an inverted index and a sentence vector.

FIG. 1 is a diagram illustrating an example of a process of generating an inverted index and a sentence vector. As illustrated in FIG. 1, an index/vector generating unit 150b in an information processing apparatus accepts text data 10a of a natural sentence. The text data 10a of the natural sentence is a general text data, such as Aozora Bunko known as a Japanese digital library. The index/vector generating unit 150*b* is an example of a generating unit.

The index/vector generating unit 150*b* generates encoded text data 140*a* by comparing the text data 10*a* with dictionary data 10*b* and encoding each of the words included in the text data 10*a* in units of words.

The dictionary data 10*b* is data that holds information on a static dictionary and a dynamic dictionary. The static dictionary is data in which a word is allocated with a static code. The dynamic dictionary holds, when allocating a dynamic code to a word that is not present in the static dictionary, the data in which the subject word is associated with the dynamic code.

For example, the index/vector generating unit 150*b* compares the text data 10*a* with the dictionary data 10*b* and converts, from among the word included in the text data 10*a*, the word that hits in the static dictionary to the static code. In contrast, the index/vector generating unit 150*b* allocates a unique dynamic code the word that does not hit in the static dictionary from among the words included in the text data 10*a* and converts the word to a dynamic code. The index/vector generating unit 150*b* associates the word with the allocated dynamic code and registers the associated word in the dynamic dictionary, in a description below, a static code and a dynamic code are collectively and appropriately referred to as a "word code".

The index/vector generating unit 150*b* generates an inverted index 140*b* in which an appearance position (offset) of a word code in the encoded text data 140*a* is associated with a word code. In the inverted index 140*b*, offsets are indicated on the horizontal axis and word codes are indicated on the vertical axis. The offset indicates the appearance position at the position counted from the top word code to the subject word code in the encoded text data 140*a*. It is assumed that the offset of the top word code is set to "0".

Furthermore, the index/vector generating unit 150*b* refers to a word vector table 10*c* for each sentence in the encoded text, data 140*a* and generates a sentence vector data 140*c*. The index/vector generating unit 150*b* acquires a word vector of each of the word codes included in the sentence from the word vector table 10*c* and accumulates each of the acquired word vectors, thereby generating a sentence vector of the sentence. The sentence vector data 140*c* stores therein a sentence vector of each of the sentences. The sentence vector data 140*c* may also associates a sentence vector with a sentence (sentence formed from a plurality of word codes) in the encoded text data 140*a*.

The word vector table 10*c* is generated based on a Word2Vec technology and formed by a plurality of vector components. For example, a word vector of "apple" co-occurs with a word of "red", "sweet", "cold", or the like and thus the value of component of "rod", "sweet", "cold", or the like tends to be increased. The word vector table 10*c* associates a word code with a word vector that is associated with the word code.

The index/vector generating unit 150*b* may also associate the encoded text data 140*a*, the inverted index 140*b*, and the sentence vector data 140*c* and store the associated information in a storage unit.

As described above, when the information processing apparatus according to the first embodiment encodes each of the words included in the text data 10*a*, the information processing apparatus generates the inverted index 140*b* in which the word code is associated with the appearance position of the word code. By using the inverted index 140*b*, because it is possible to easily specify the relationship between each of the word codes and the position of each of the word codes, it is possible to speed up various processes (for example, a process of generating a word HMM or the like) using the word codes. Furthermore, by also generating the sentence vector data 140*c* of each sentence, it is also possible to speed up a process of generating a sentence HMM.

Figure 2:
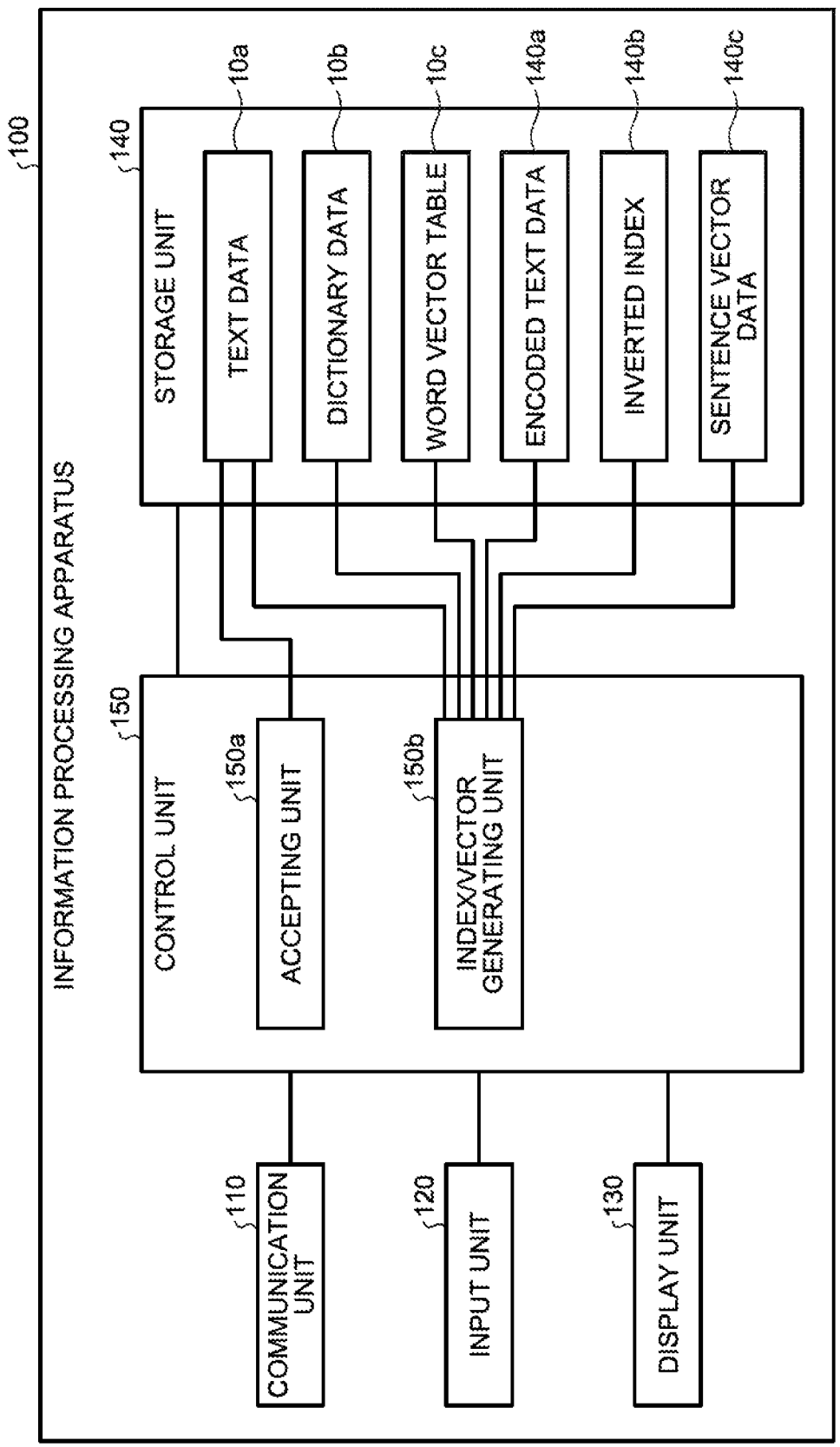
FIG. 2 is a functional block diagram illustrating a configuration of an information processing apparatus according to a first embodiment.

FIG. 2 is a functional block diagram illustrating a configuration of the information processing apparatus according to a first embodiment. As illustrated in FIG. 2, an information processing apparatus 100 includes a communication unit 110, an input unit 120, a display unit 130, a storage unit 140, and a control unit 150.

The communication unit 110 is a processing unit that performs data communication with an external device via a network. The communication unit 110 is an example of a communication device. The information processing apparatus 100 may also use the communication unit 110 and receive the text data 10*a* from the external device via the network.

The input unit 120 is an input device for inputting various kinds of data to the information processing apparatus 100. For example, the input unit 120 corresponds to a keyboard, a mouse, a touch panel, or the like.

The display unit 130 is a display device for displaying various kinds of data output from the control unit 150. For example, the display unit 130 corresponds to a liquid crystal display, a touch panel, or the like.

The storage unit 140 includes the text data 10*a*, the dictionary data 10*b*, the word vector table 10*c*, the encoded text data 140*a*, the inverted index 140*b*, and the sentence vector data 140*c*. The storage unit 140 corresponds to a semiconductor memory device, such as a random access memory (RAM), a read only memory (ROM), and a flash memory, or a storage device, such as a hard disk drive (HDD).

The text data 10*a* is general text data, such as Aozora Bunko known as a Japanese digital library.

The dictionary data 10*b* is data that holds information on a static dictionary and a dynamic dictionary. The static dictionary is data in which a word is associated with a static code. The dynamic dictionary holds, when a unique dynamic code is allocated to a word that is not present in the static dictionary, data in which the subject word is associated with a dynamic code.

The word vector table 10*c* is a table that holds a word code and information on a word vector that is associated with the word code.

The encoded text data 140*a* is text data that has been encoded based on the dictionary data 10*b*. The encoded text data 140*a* is encoded for each word included in the text data 10*a*.

The inverted index 140*b* is information in which the appearance position (offset) of the word code in the encoded text data 140*a* is associated with a word code, as described above by using FIG. 1 or the like, in the inverted index 140*b*, offsets are indicated on the horizontal axis and word codes are indicated on the vertical axis. The offset of the top word code in the encoded text data 140*a* is set to "0". For example, if the third word code from the top word code in the encoded text data 140*a* is "A03", a flag "1" is set at the position in which the column of the offset "2" intersects the row of the word code "A03" in the inverted index 140*b*.

The sentence vector data 140*c* is information that holds a sentence vector of each of the sentences included in the text data 10*a*.

The control unit 150 includes an accepting unit 150*a* and an index/vector generating unit 150*b*. The control unit 150 can be implemented by a central processing unit (CPU), a micro processing unit (MPU), or the like. Furthermore, the control unit 150 may also be implemented by hard-wired logic, such as an application specific integrated circuit (ASIC) or a field programmable gate array (FPGA).

The accepting unit 150a is a processing unit that accepts the text data 10a from the external device via the network. The accepting unit 150a stores the accepted text data 10a in the storage unit 140.

The index/vector generating unit 150b is a processing unit that generates the inverted index 140b and the sentence vector data 140c by performing the processes described by using FIG. 1. First, an example of the process in which the index/vector generating unit 150b generates the inverted index 140b will be described.

The index/vector generating unit 150b generates the encoded text data 140a by comparing the text data 10a with the dictionary data 10b and encoding each of the words included in the text data 10a in each of units words. It is assumed that the index/vector generating unit 150b specifies each of the sentences based on full stops, periods, and the like included in the text data 10a.

For example, the index/vector generating unit 150b compares the text data 10a with the dictionary data 10b and converts the word that hits in the static dictionary from among the words included in the text data 10a to a static code (word code).

The index/vector generating unit 150b allocates the word that does not hit in the static dictionary from among the words included in the text data 10a to a dynamic code and converts to the allocated dynamic code. The index/vector generating unit 150b associates the word (word that is not present in the static dictionary) with the allocated dynamic code (word code) and registers the associated information in the dynamic dictionary.

The index/vector generating unit 150b generates the inverted index 140b by associating, lot each word code in the encoded text data 140a, the appearance position (offset) of a word code with the word code. In the inverted index 140b, offsets are indicated on the horizontal axis and the word codes are indicated on the vertical axis. The offset indicates the appearance position at the position counted from the word code to the subject word code in the encoded text data 140a. It is assumed that the offset of the top word code to "0".

In the following, an example of a process in which the index/vector generating unit 150b generates sentence vector data. The index/vector generating unit 150b calculates a word vector of each of the word codes included in the sentence in the encoded text data 140a. For example, the index/vector generating unit 150b compares the word code with the word vector table 10c and specifies the word vector of each of the word codes included in the sentence. The index/vector generating unit 150b calculates a sentence vector of the sentence by accumulating the word vectors of the word codes included in the sentence. The index/vector generating unit 150b calculates the sentence vector for each sentence and registers the information on the calculated sentence vector in the sentence vector data 140c.

The index/vector generating unit 150b associates the encoded text data 140a, the inverted index 140b, and the sentence vector data 140c and stores the associated information in the storage unit 140. Furthermore, the index/vector generating unit 150b may also output, to the external device, file information in which the encoded text data 140a, the inverted index 140b, and the sentence vector data 140c are associated.

Figure 3:
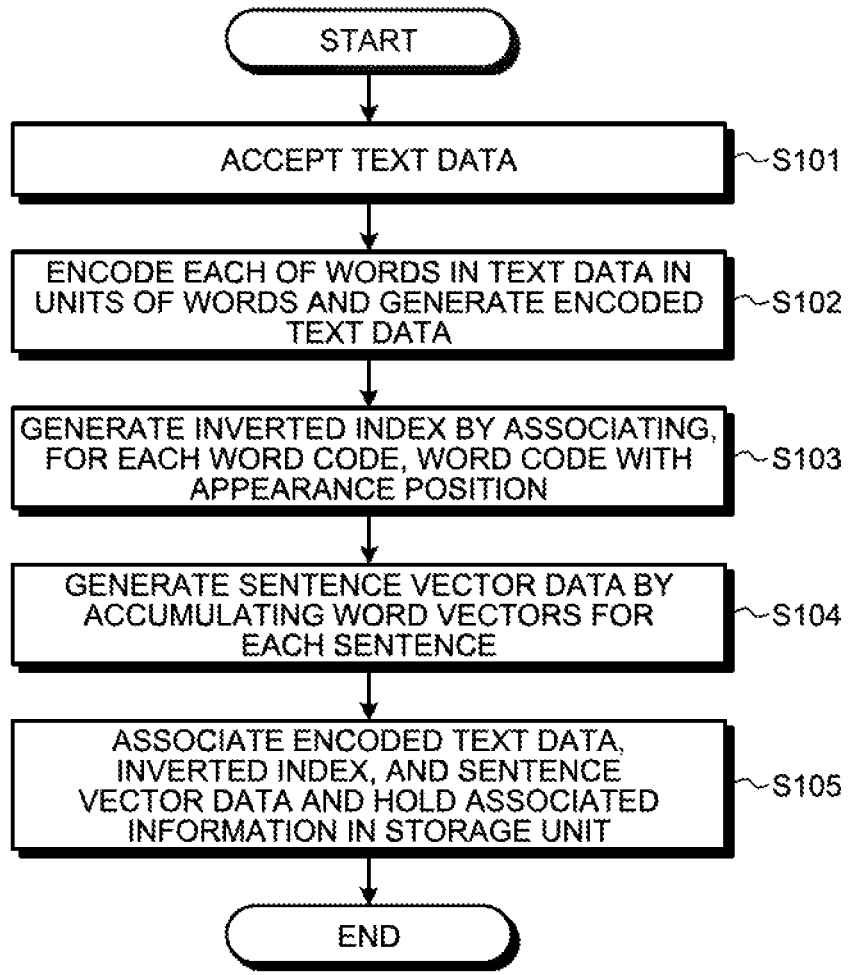
FIG. 3 is a flowchart illustrating the flow of a process in which the information processing apparatus generates the inverted index and the sentence vector.

In the following, an example of the flow of a process performed by the information processing apparatus 100 will be described. FIG. 3 is a flowchart illustrating the flow of the process in which the information processing apparatus generates the inverted index and the sentence vector. As illustrated in FIG. 3, the accepting unit 150a in the information processing apparatus 100 accepts the text data 10a (Step S101). The index/vector generating unit 150b in the information processing apparatus 100 encodes each of the words in the text data 10a in units of words and generates the encoded text data 140a (Step S102).

The index/vector generating unit 150b generates the inverted index 140b by associating, for each word code, a word code with an appearance position (Step S103). The index/vector generating unit 150b generates the sentence vector data 140c by accumulating the word vectors for each sentence and generating a sentence vector (Step S104).

The index/vector generating unit 150b associates the encoded text data 140a, the inverted index 140b, and the sentence vector data 140c and holds the associated information in the storage unit 140 (Step S105).

In the following, the effects of the information processing apparatus 100 according to the embodiment will be described. When the information processing apparatus 100 specifies the word included in the text data 10a, the information processing apparatus 100 generates the inverted index 140b in which the word code associated with the word is associated with the appearance position. Furthermore, the information processing apparatus 100 generates the sentence vector data 140c by accumulating the word vectors for each sentence. By using the inverted index 140b, it is possible to easily specify the relationship between each of the word codes and the position of each of the word codes; therefore, it is possible to speed up various processes (for example, process of generating a word HMM or the like) that use the word codes. Furthermore, by also generating the sentence vector data 140c of each sentence, it is also possible to speed up the process of generating a sentence HMM.

[b] Second Embodiment

An information processing apparatus according to a second embodiment generates a word hmm and a sentence HMM by using the encoded text data 140a, the inverted index 140b, and the sentence vector data 140c generated in the first embodiment.

Figure 4:
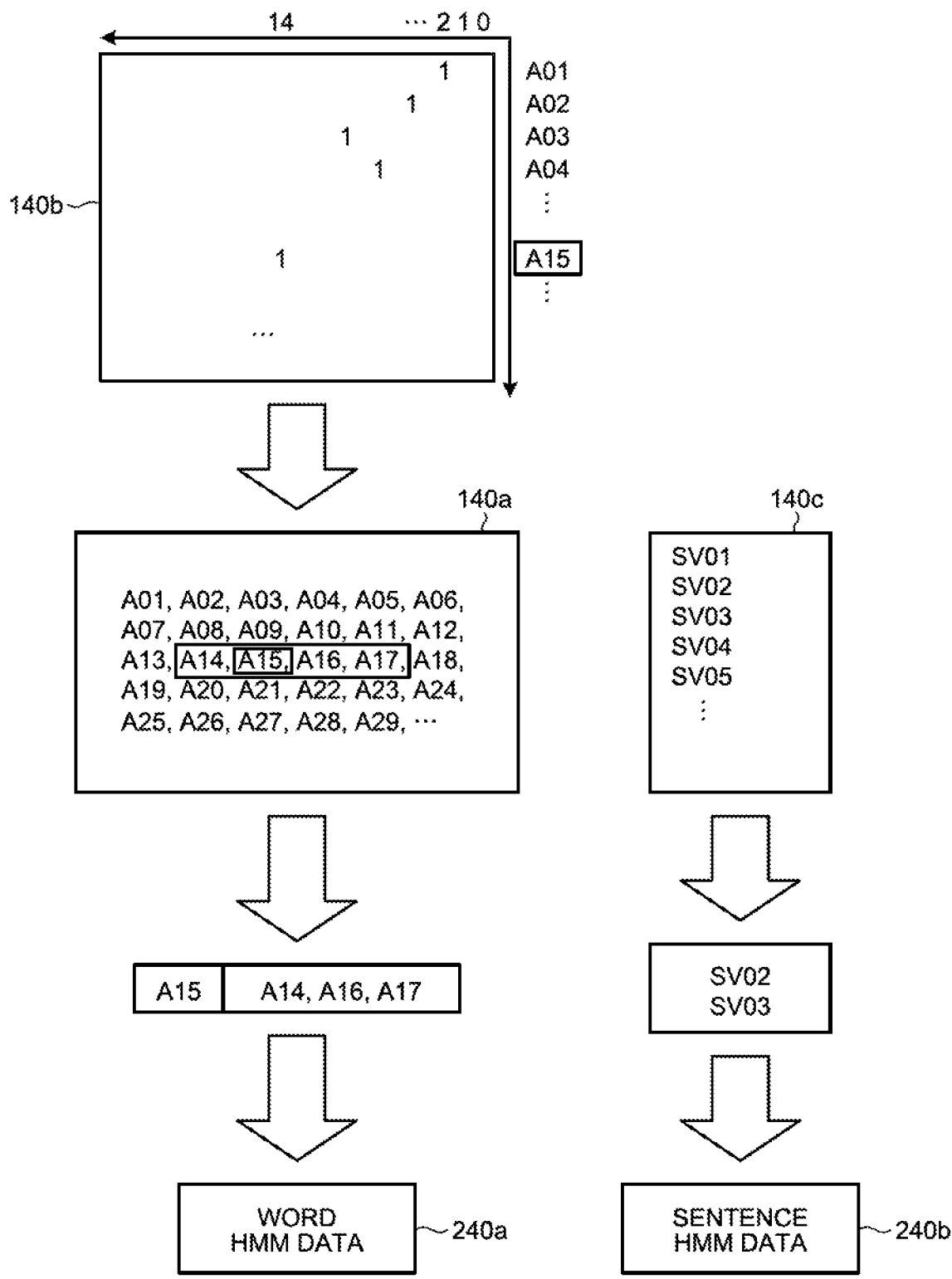

FIG. 4 is a diagram illustrating an example of a process of generating the word HMM and the sentence HMM. The information processing apparatus specifies a word code of a "homophone". For example, in the dictionary data 10b described in the first embodiment, information indicating whether a word code is a homophone (phonemes having the same pronunciation but different meanings or Kana characters having the same pronunciation but different meanings) is included and the information processing apparatus specifies a word code of a homophone based on the dictionary data.

For example, kana notation of each of "come true", such as "dreams come true"; "meet", such as "meet one's ideal"; and "match", such as "match a strong rival" is the same but they but have different meanings. Thus, these words are homophones that are pronounced the same but have different meanings written by different characters.

The information processing apparatus specifies, by comparing a word code of a homophone with the inverted index 140b, the appearance position of the word code of the homophone in the encoded text data 140a. For example, if a word code "A15" is a word code of a homophone, the appearance position of the word code "A15" is at the position of "14" counted from the top based on the inverted index 140b.

Here, information processing apparatus specifies each of the word codes included in the same sentence that includes the word code of the homophone. The information processing apparatus may also classify each of the word codes included in the encoded text data 140a into each of the word codes included in the same sentence or may also specify each of the word codes included in the same sentence as that of the word code of the homophone by using, as a key, the word code that includes a full stop or a period.

For example, it is assumed that the word code of the word that becomes a homophone is set to "A15" and it is assumed that each of the word codes included in the same sentence as that of the homophone is set to "A14, A16, and A17". In a description below, the sentence that includes a homophone is appropriately referred to as a "target sentence".

The information processing apparatus compares each of the word codes "A14, A16, and A17" included in the target sentence with the word vector table 10c and specifies each of the word vectors of the word codes "A14, A16, and A17" that co-occurs with the word code "A15" of the homophone. The information processing apparatus specifies a word vector of each of the word codes included in the target sentence as the word vector of the word code that co occurs with the word code of the homophone. The information processing apparatus generates word HMM data 240a based on the specified result.

In the example illustrated in FIG. 4, the word code "A15" of the word that is the homophone is indicated at a single position in the encoded text data 140a; however, the position is not limited to this and it is assumed that a plurality of positions is present. Thus, a plurality of target sentences each of which includes the word code "A15" is specified from the encoded text data 140a and the word HMM data 240a is generated by using a word vector of a word code of each of the target sentences.

The information processing apparatus by specifying, regarding each of the target sentences including a word code of the same homophone "fulfill", each of the word vectors of the target sentence, thereby specifying a word vector of the word that co-occurs with "fulfill". Consequently, it is possible to specify the relationship (For example, a co-occurrence rate) between the word code of "fulfill" and the word code of another word.

FIG. 5 is a diagram illustrating an example of the data structure of the word HMM data. As illustrated in FIG. 5, the word HMM associates a word vector with a co-occurrence word vector. The word vector indicates a word vector of a homophone. The co occurrence word vector indicates a word vector of the word that co-occurs with before and after the homophone and indicates a co-occurrence rate. For example, in FIG. 5, the homophone of the word code "A025" indicates that the probability of co-occurrence with the word of a co-occurrence word vector "Dα108F97" is "37%". Furthermore, the homophone of the word code "A025" indicates that the probability of co-occurrence with the word of a co-occurrence word vector "Dα108F19" is "29%".

In contrast, the information processing apparatus generates sentence HMM data 240b by specifying the relationship between the sentence vector of the target sentence that includes the homophone and the sentence vector of the sentence that co-occurs in the vicinity of the subject target sentence (for example, before and after the target sentence).

The information processing apparatus acquires, from the sentence vector data 140c, the sentence vectors of the sentences before and after the target sentence. In the example illustrated in FIG. 4, "SV02, SV03" are extracted as the sentence vectors of the sentences before and after the target sentence.

FIG. 6 is a diagram illustrating an example of the data structure of the sentence HMM data. As illustrated in FIG. 6, the sentence HMM data 240b associates a sentence vector with a co-occurrence sentence vector. The sentence vector indicates a sentence vector of the target sentence that includes a homophone. The co-occurrence sentence vector indicates the sentence vectors of the sentences that co-occur with before and after the target sentence. For example, the target sentence of the sentence vector "SV15" indicates that the probability of co-occurrence with a sentence of a co-occurrence sentence vector "Dβ108F97" is "34%". The target sentence of the sentence vector "SV15" indicates that the probability of co-occurrence with a sentence of a co-occurrence sentence vector "Dβ108F19" is "19%".

Furthermore, the information processing apparatus integrates the sentence vectors of each of the target sentences that include the same homophone by averaging each of the sentence vectors of the target sentences.

As described above, the information processing apparatus according to the second embodiment specifies the word code that co-occurs with the word code of a homophone based on the word code of the homophone and the inverted index 140b. The information processing apparatus acquires the word vector associated with each of the word codes from the word vector table 10c. Consequently, it is possible to generate the word HMM data 240a with respect to a homophone or a polysemous word from a natural sentence text at high speed.

Furthermore, the information processing apparatus specifies the position of the word code included in the target sentence based on the inverted index 140b and acquires the sentence vector of the sentence that co-occurs with the target sentence from the sentence vector data 140c. Consequently, it is possible to generate the sentence HMM data 240b with respect to a homophone or a polysemous word from a natural sentence text at high speed.

FIG. 7 is a functional block diagram illustrating a configuration of the information processing apparatus according to a second embodiment. As illustrated in FIG. 7, an information processing apparatus 200 includes a communication unit 210, an input unit 220, a display unit 230, a storage unit 240, and a control unit 250.

The communication unit 210 is a processing unit that performs data communication with an external device via a network. The communication unit 210 is an example of a communication device. The information processing apparatus 200 may also use the communication unit 210 and receive the text data 10a or the like from the external device via the network. Furthermore, the communication unit 210 may also perform data communication with the information processing apparatus 100 described in the first embodiment and acquire the encoded text data 140a, the inverted index 140b, and sentence vector data.

The input unit 220 is an input device for inputting various kinds of data to the information processing apparatus 200. For example, the input unit 220 corresponds to a keyboard, a mouse, a touch panel, or the like.

The display unit 230 is a display device for displaying various kinds of data output from the control unit 250. For example, the display unit 230 corresponds to a liquid crystal display, a touch panel, or the like.

The storage unit 240 includes the text data 10a, the dictionary data 10b, the word vector table 10c, the encoded text data 140a, the inverted index 140b, and the sentence vector data 140c. Furthermore, the storage unit 240 includes the word HMM data 240a and the sentence HMM data 240b. The storage unit 240 corresponds to a semiconductor memory device, such as a RAM, a ROM, a flash memory, or a storage device, such as an HDD.

Descriptions of the text data 10a, the dictionary data 10b, the word vector table 10c, the encoded text data 140a, the inverted index 140b, and the sentence vector data 140c are the same as those of data described with reference to FIG. 2; therefore, the descriptions thereof will be omitted.

The word HMM data 210a is data that associates a word vector of a homophone, a word vector of a word that co-occurs with the homophone, and a co-occurrence rate. The data structure of the word HMM data 240a corresponds to the data structure of the word HMM data 240a described in FIG. 5.

The sentence HMM data 240b is data that associates a sentence vector of the target sentence that includes a homophone with a sentence vector of the sentence that co-occurs with the subject target sentence, and a co-occurrence rate. The data structure of the sentence HMM data 240b corresponds to the data structure of the sentence HMM data 240b described with reference to FIG. 6.

The control unit. 250 includes the accepting unit 150a, the index/vector generating unit 150b, and an HMM generating unit 250a. The control unit 250 can be implemented by a CPU, an MPU, or the like. Furthermore, the control unit 250 is also implemented by hard-wired logic, such as an ASIC or an FPGA.

Descriptions of the processes performed by the accepting unit 150a and the index/vector generating unit 150b are the same as those of the processes performed by the accepting unit 150a and the index/vector genera Ling unit 150b described with reference to FIG. 2. Furthermore, if the information processing apparatus 200 acquires and uses the encoded text data 140a, the inverted index 140b, and the sentence vector data 140c from the information processing apparatus 100 described in the first embodiment, the information processing apparatus 200 does not need to include the accepting unit 150a and the index/vector generating unit 150b.

The HMM generating unit 250a is a processing unit that generates the word HMM data 240a and the sentence HMM data 240b by performing the process described by using FIG. 4 or the like.

In the following, an example of a process in which the HMM generating unit 250a generates the word HMM data 240a will be described. The HMM generating unit 250a refers to the dictionary data 10b and specifies a word code of a homophone. The HMM generating unit 250a specifies, by comparing the word code of the homophone with the inverted index 140b, the appearance position of the word code of the homophone in the encoded text data 140a.

When the HMM generating unit 250a specifies the appearance position of the word code of the homophone in the encoded text data 140a, the HMM generating unit 250a specifies each of the word codes included in the same sentence (target sentence) as that of the word code of the homophone. The HMM generating unit 250a may also classify each of the word codes included in the encoded text data 140a into each of the word codes that are included in the same sentence or may also specify each of the word codes included in the same sentence as that of the word code of the homophone by using, as a key, the word code that includes a full stop or a period.

The HMM generating unit 250a compares each of the word codes included in the target sentence with the word vector table and specifies a word vector of each of the word codes that are included in the target sentence. The HMM generating unit 250a specifies the word vector of each of the word codes included in the target sentence as the word vector of the word code that co-occurs with the word code of the homophone. The information processing apparatus generates the word HMM data 240a based on the co-occurrence rate of the specified word vector.

Also, regarding the other target sentences each of which includes the same word code of the homophone, the HMM generating unit 250a also acquires each of the word codes included in the target sentence. By performing the process described above, the HMM generating unit 250a calculates a word code of a homophone, a word code that co-occurs with the word code, and a co-occurrence rate and generates the word HMM data 240a.

Also, regarding the other word codes of the homophones, by performing the process described above, the HMM generating unit 250a also calculates a cc-occurrence rate of the word code that co-occurs with the word code of the homophone and registers the calculated co-occurrence rate in the word HMM data 240a.

In the following, an example of a process in which the HMM generating unit 250a generates the sentence HMM data 240b will be described. The HMM generating unit 250a compares the word code of the homophone with the inverted index 140b and specifies the target sentence. Furthermore, the HMM generating unit 250a specifies the sentences appearing before and after the target sentence.

The HMM generating unit 250a specifies a sentence vector of each of the sentences by comparing the target sentence, the sentences appearing before and after the target sentence, and the sentence vector data 140c. Also, regarding the other target sentences including the same homophone and the sentences appearing before and after the subject target sentence, the HUM generating unit 250a specifies the sentence vector of each of the sentences by comparing the sentences with the sentence vector data 140c.

The HMM generating unit 250a calculates a co-occurrence rate of each of the sentence vectors of the sentences that co-occur with before and after the sentence vector of the target sentence. The HMM generating unit 250a generates the sentence HMM data 240b by associating the sentence vector of the target sentence, the sentence vectors that co-occur with the sentence vector of the target sentence, and the co-occurrence rate. Furthermore, because the sentence vectors of the associated target sentences including the same homophone are not the same, a sentence vector of the target sentence may also be used by averaging each of the sentence vectors of the target sentences. The HMM generating unit 250a may also select one of the sentence vectors of the associated target sentences as a representative vector and use the representative vector as the sentence vector of the target sentence.

In the following, an example of a process performed by the information processing apparatus 200 according to the second embodiment will be described. FIG. 8 is a flowchart illustrating the flow of the process in which the information processing apparatus generates the word HMM data and the sentence HMM data. As illustrated in FIG. 8, the HMM generating unit 250a in the information processing apparatus 200 compares the word code associated with the homophone with the inverted index 140*b* and specifies the target sentence in the encoded text data 140*a* (Step S201).

The HMM generating unit 250*a* specifies a word code (word vector of the word code) that is included in the target sentence and that co-occurs with the word code (word vector of the word code) of the homophone (Step S202).

The HMM generating unit 250*a* generates word HMM data based on the relationship between the word code (word vector of the word code) of the homophone and another word code (word vector of the word code) that co-occurs with the word code of the homophone (Step S203). The HMM generating unit 250*a* holds the word HMM data (Step S204).

The HMM generating unit 250*a* generates the sentence HMM data 240*b* based on the relationship between the word code of the homophone included in the target sentence and the sentence vector of the sentence adjacent to the target sentence (Step S205). The HMM generating unit 250*a* holds the sentence HMM data (Step S206).

In the following, the effect of the information processing apparatus 200 according to the second embodiment will be described. The information processing apparatus 200 specifies, based on the word code of the homophone and the inverted index 140*b*, the word code that co-occurs with the word code of the homophone. The information processing apparatus acquires the word vector associated with each of the word codes from the word vector table 10*c*. Consequently, it is possibly to generate the word HMM data 240*a* with respect to homophone a polysemous word from a natural sentence text at high speed.

Furthermore, the information processing apparatus specifies the position of the word code included in the target sentence based on the inverted index 140*b* and acquires the sentence vector of the sentence that co-occurs with the target sentence from the sentence vector data 140*c*. Consequently, it is possible to generate the sentence HMM data 240*b* with respect to a homophone or a polysemous word from a natural sentence text at high speed.

In the following, a description will be given of an example of a hardware configuration of a computer that implements the same function as that performed by each of the information processing apparatuses 100 and 200 described above in the embodiment. FIG. 9 is a diagram illustrating an example of the hardware configuration of the computer that implements the same function as that of the information processing apparatus.

As illustrated in FIG. 9, a computer 300 includes a CPU 301 that performs various kinds of arithmetic processing, an input device 302 that receives an input of data from a user, and a display 303. Furthermore, the computer 300 includes a reading device 304 that reads programs or the like from a storage medium and an interface device 305 that sends and receives data to and from recording equipment via a wired or wireless network. Furthermore, the computer 300 includes a RAM 306 that temporarily stores therein various kinds of information and a hard disk device 307. Each of the devices 301 to 307 is connected to a bus 303.

The hard disk device 307 includes an accepting program 307*a*, an index/vector generating program 307*b*, and an HMM generating program 307*c*. Furthermore, the hard disk device 307 reads each of the programs 307*a* to 307*c* and loads the programs in the RAM 306.

The accepting program 307*a* functions as an accepting process 306*a*. The index/vector generating program 307*b* functions as an index/vector generating process 306*b*. The HMM generating program 307*c* functions as an HMM generating process 306*c*.

The process of an accepting process 306*a* corresponds to the process performed by the accepting unit 150*a*. The process of an index/vector generating process 306*c* corresponds to the process performed by the index/vector generating unit 150*b*. The process of the HMM generating process 306*c* corresponds to the process performed by the HMM generating unit 250*a*.

Furthermore, each of the programs 307*a* to 307*c* does not need to be stored in the hard disk device 307 in advance from the beginning. For example, each of the programs is stored in a "portable physical medium", such as a flexible disk (FD), a CD ROM, a DVD disk, a magneto optic disk, an IC CARD, that is to be inserted into the computer 300. Then, the computer 300 may also read each of the programs 307*a* to 307*c* from the portable physical medium and execute the programs.

It is possible to speed up a process of generating a statistical model of, for example, a word HMM, a sentence HMM, and the like.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing method executed using a processor, the method comprising:

accepting text data, wherein the accepted text data comprises a plurality of sentences and each sentence comprises a plurality of words;

specifying a word included in the accepted text data;

first generating of a word code associated with the specified word and storing in a dictionary the specified word with the generated word code;

second generating of an encoded text data and an inverted index by:
 generating the encoded text data by encoding each word of the plurality of words of the accepted text data with a corresponding word code based on matching each word in the dictionary; and
 generating the inverted index to associate an appearance position of each corresponding word code in the encoded text data with the corresponding word code;

obtaining a word vector table comprising a plurality of word vectors, each word vector representing a particular word and one or more co-occurring words for the particular word, the word vector comprising a particular word code associated with the particular word and one or more co-occurring word codes associated with the one or more co-occurring words;

third generating of sentence vector data for the plurality of sentences using the word vector table by accumulating the word vectors respectively associated with each of the plurality of words in each sentence of the plurality of sentences including a character string of a homophone or a polysemous word in the accepted text data, with reference to the word vector table in which the word vector of the word code corresponding to each of the plurality of words is associated with the word vector of the word code corresponding to the plurality of co-occurrence words co-occurring with each of the plurality of words;

storing the dictionary including the generated word code, the inverted index, and the sentence vector data in association with the accepted text data;

generating a word Hidden Markov Model (HMM) based on the encoded text data by:
  determining a homophone word code for a homophone word in the accepted text data using the dictionary;
  specifying a word code of a homophone and the appearance position of the word code of the homophone in the encoded text data;
  specifying each of word codes included in the same sentence that includes the word code of the homophone; and
  using a first co-occurrence rate of the specified word code of the homophone and each specified word codes included in the same sentence to generate the word HMM; and generating a sentence HMM based on the sentence vector data by:
  specifying first sentence vector data in the sentence vector data of a target sentence in the accepted text data including the homophone word;
  specifying second sentence vector data in the sentence vector data of at least one before co-occurrence sentence that occurs before the target sentence in the accepted text data and at least one after co-occurrence sentence that occurs after the target sentence in the accepted text data;
  determining a second co-occurrence rate of the second sentence vector data; and
  generating the sentence HMM using the first sentence vector data, the second sentence vector data, and the second co-occurrence rate.

2. An information processing apparatus comprising:
a hardware processor that executes a process comprising:
  accepting text data, wherein the accepted text data comprises a plurality of sentences and each sentence comprises a plurality of words;
  specifying a word included in the accepted text data;
  first generating of a word code associated with the specified word and storing in a dictionary the specified word with the generated word code;
  second generating of an encoded text data and an inverted index by:
    generating the encoded text data by encoding each word of the plurality of words of the accepted text data with a corresponding word code based on matching each word in the dictionary; and
    generating the inverted index to associate an appearance position of each corresponding word code in the encoded text data with the corresponding word code;
  obtaining a word vector table comprising a plurality of word vectors, each word vector representing a particular word and one or more co-occurring words for the particular word, the word vector comprising a particular word code associated with the particular word and one or more co-occurring word codes associated with the one or more co-occurring words;
  third generating of sentence vector data for the plurality of sentences using the word vector table by accumulating the word vectors respectively associated with each of the plurality of words in each sentence of the plurality of sentences including a character string of a homophone or a polysemous word in the accepted text data, with reference to the word vector table in which the word vector of the word code corresponding to each of the plurality of words is associated with the word vector of the word code corresponding to the plurality of co-occurrence words co-occurring with each of the plurality of words;
  storing the dictionary including the generated word code, the inverted index, and the sentence vector data in association with the accepted text data;
  generating a word Hidden Markov Model (HMM) based on the encoded text data by:
    determining a homophone word code for a homophone word in the accepted text data using the dictionary;
    specifying a word code of a homophone and the appearance position of the word code of the homophone in the encoded text data;
    specifying each of word codes included in the same sentence that includes the word code of the homophone; and
    using a first co-occurrence rate of the specified word code of the homophone and each specified word codes included in the same sentence to generate the word HMM; and
  generating a sentence HMM based on the sentence vector data by:
    specifying first sentence vector data in the sentence vector data of a target sentence in the accepted text data including the homophone word;
    specifying second sentence vector data in the sentence vector data of at least one before co-occurrence sentence that occurs before the target sentence in the accepted text data and at least one after co-occurrence sentence that occurs after the target sentence in the accepted text data;
    determining a second co-occurrence rate of the second sentence vector data; and
    generating the sentence HMM using the first sentence vector data, the second sentence vector data, and the second co-occurrence rate.

* * * * *